June 14, 1960 S. L. REICHES 2,941,102

POST DEFLECTION COLOR PURITY CORRECTING DEVICE FOR A COLOR TV CATHODE RAY TUBE AND SYSTEM USING THE SAME

Filed July 26, 1956 3 Sheets-Sheet 1

INVENTOR.
Sol L. Reiches
BY George E Frost
Attorney

INVENTOR.
Sol L. Reiches
BY George E Frost
Attorney

SOL L. REICHES INVENTOR.

BY George E. Frost
ATTORNEY

United States Patent Office 2,941,102

Patented June 14, 1960

2,941,102

POST DEFLECTION COLOR PURITY CORRECTING DEVICE FOR A COLOR TV CATHODE RAY TUBE AND SYSTEM USING THE SAME

Sol L. Reiches, 6900 Wade Park Ave., Shaker Heights 3, Ohio

Filed July 26, 1956, Ser. No. 600,314

5 Claims. (Cl. 313—77)

This application is a continuation in part of my copending application entitled Post Deflection Color Purity Correcting Device for a Color TV Cathode Ray Tube, Serial Number 564,197, filed February 8, 1956, now abandoned, and assigned to the same assignee as this application.

My invention relates to an improved post deflection color purity correcting device for a cathode ray tube and a system using the same, characterized by the ability in a single unit to accomplish the same color purity correction which has heretofore required separate magnet assemblies, one embracing the neck of the cathode ray tube and the other located at the bell portion adjacent the viewing screen.

One of the problems incident to the use of the color image reproducing tubes, such as the so-called shadow mask type, the post acceleration tube, the apple tube or the focus mask tube to reconstitute the color picture of a television transmission is that of achieving color purity. The shadow mask tube, for example, uses three electron guns to produce ray beams modulated in accord with the three primary color components of the image to be reproduced. Faithful reproduction of the original colors demands that each of these beams energize only the phosphor dots producing illumination of the color for which the respective beam is modulated. In the manufacture of tubes of this kind optical methods are used to simulate the action of the respective electron guns and thereby locate the respective phosphor dots required for reproduction of the various colors. These optical methods are based on the premise that the electron beams act as if each originates from a design center or point during deflection. In operation, however, the electron streams do not behave exactly as the optical methods predict and other departures from the theoretical ideal require the use of adjustable means to compensate for these departures and restore the color purity of the image. Similar problems arise in connection with the other types of color television tubes for operation is dependent in at least some measure on the electron streams acting as if originating from a design center or point during deflection.

Heretofore, color purity correction has been achieved by the use of a purity magnet assembly located in the neck of the cathode ray tube. Such a unit acts on the electron beams before they are deflected in sweep motions and can at most provide some measure of correction for the departures of the actual electron stream performance from the theoretical ideal. Some additional correction has been obtained through use of the equalizing magnet assembly shown and described in my copending patent application entitled, "Color Pure Cathode Ray Tube Display System and Color Purity Corrector Therefor," Serial No. 476,013, filed December 17, 1954.

In accordance with the present invention a color purity corrector is located on the conical bell portion of the cathode ray tube intermediate the electron gun or guns and the viewing screen. Briefly, the corrector includes a band of non-magnetic material which encircles the axis of the tube in a plane normal to that axis. A plurality of permanent magnet units are mounted on the band in circumferential spaced relationship and are respectively rotatable about axes radially oriented in relation to the axis of the tube and axes in planes to the radial axes. The unit produces an adjustable magnetic field of generally pie-shaped configuration as seen in the plane of the band, so that the field intensity is a maximum at the margins of the bell of the tube and becomes progressively weaker as the axis is approached.

Adjustment of the respective magnets serves to control the orientation and intensity of the magnetic field within the tube envelope. This control automatically, however, provides a magnetic field of decreased intensity as the tube axis is approached, and thereby affects the electron beams in accordance with their position of sweep. Moreover, since the action takes place at locations between the electron guns and the shadow mask and viewing screen, the adjustments serve to deflect the electron beams in fashion serving the same overall function as the purity magnet assemblies heretofore used. In substance, the action of the respective magnets is to cause the electron beams to act as if they originated at the theoretical design center of the tube, thus giving rise to faithful color reproduction.

An additional advantage of the construction of the present invention is that the color purity corrector is located largely within the confines of the enlarged end of the bell of the tube, so that it is not necessary to provide additional cabinet space to accommodate the unit. This is very important since cabinet size is an important limiting factor in practical receiver construction.

In a modified form of the present invention the magnets have fixed axes generally parallel to the axis of the tube, and means is provided to vary the intensity of the spaced magnet poles they define.

It is therefore a general object of the present invention to provide an improved color purity correcting device and system using the same for a color cathode ray tube which serves to provide color purity correction in a single unit.

Another object of the present invention is to provide a color purity corrector and system using the same which is located on the bell of the cathode ray tube and is within the confines of the enlarged end of the bell of the tube.

Still another object of the present invention is to provide a color purity corrector and system using the same which uses a plurality of magnets so arranged that a magnetic field is created of progressively decreased intensity as the tube axis is approached.

Another object of the present invention is to provide color purity correction devices and systems utilizing the same which are capable of shifting the ray beams in any direction and to any extent (up to a maximum) from the initial position.

It is yet another object of the present invention to provide color purity correcting devices and systems using the same which serve to provide color purity correction in a highly efficient manner.

It is yet another object of the present invention to provide a color purity corrector and system using the same which is of simple construction, utilizes only permanent magnets of readily obtained types, can be inexpensively manufactured, is readily applied to various tube and receiver constructions, and permits control of both radial and circumferential cathode ray beam deflection and the extent of each.

The novel features which I believe to be characteristic of my invention are set forth with particularity in the appended claims. My invention itself, however, together with further objects and advantages thereof, will best be understood by reference to the following description taken in connection with the accompanying drawings in which:

Figure 11:
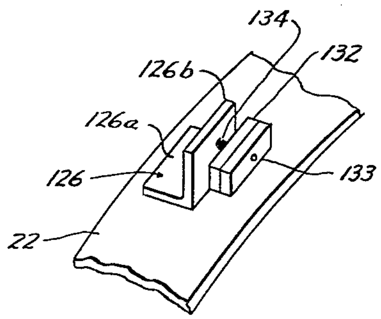
Figure 12:
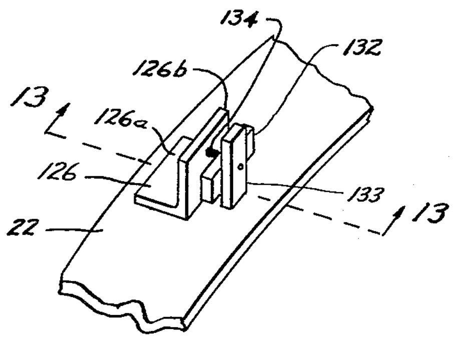
Figure 13:
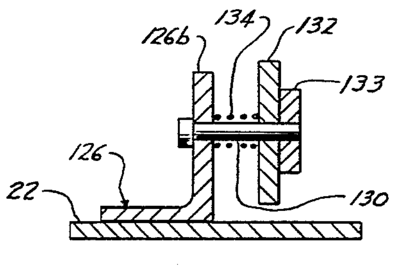

Figures 10*a* to 10*f* are diagrams showing how the form of the invention of Figures 1–9 operates;

Figures 11 and 12 are fragmentary views in perspective of an alternative embodiment of the present invention; and Figure 13 is a cross-sectional view through axis 13—13, Figure 12.

Figures 1, 2, 3, 4, 5:
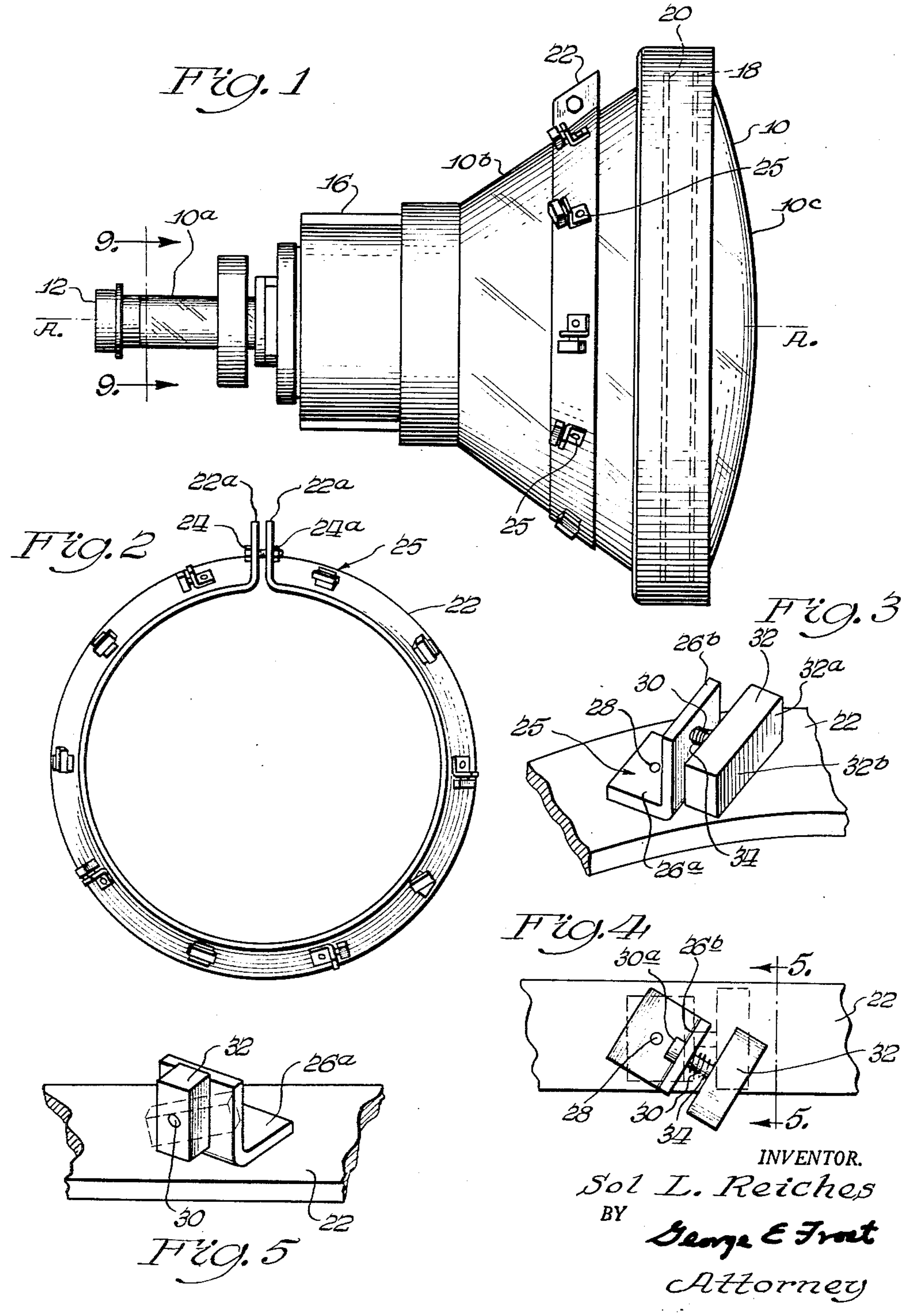
Figure 1 is a top plan view of a cathode ray tube for color TV reception of the type to which the present invention is applicable, together with the associated ray beam deflection and adjusting mechanism and the post deflection color field purifier mechanism of the present invention.
Figure 2 is an axial elevational view of the color purifier of the present invention.
Figure 3 is a fragmentary enlarged view in perspective showing a portion of the mounting strap of the mechanism and one of the adjustable magnet units.
Figure 4 is a top plan view of the portion of the mechanism shown in Figure 3 and showing by dashed lines an alternative position of bracket adjustment.
Figure 5 is a cross-sectional view through axis 5—5, Figure 4 and showing by dashed lines an alternative position of magnet adjustment.

Referring now to Figure 1, there is shown at 10 the envelope of a cathode ray tube, which, for purposes of illustration, is of the shadow mask type. The tube has a neck portion 10*a*, a conical or flaring portion 10*b*, and a convex front face plate 10*c* as shown. A socket 12 is affixed to the end of the neck portion 10*a* to make electrical connection with the socket prongs (not shown) which protrude from the neck portion to connect to the various elements within the tube. As indicated by the dotted lines, there is provided a phosphor plate 18, hereinafter described in detail, within the confines of the envelope 10 and immediately behind the face plate 10*c*. In addition, a shadow mask 20 is interposed between the phosphor plate 18 and the neck portion 10*a* of the tube, the mask 20 being comparatively close to the phosphor plate 18 and coacting with the phosphor plate to give color picture reproduction as hereinafter described.

Figures 6, 7, 8, 9:
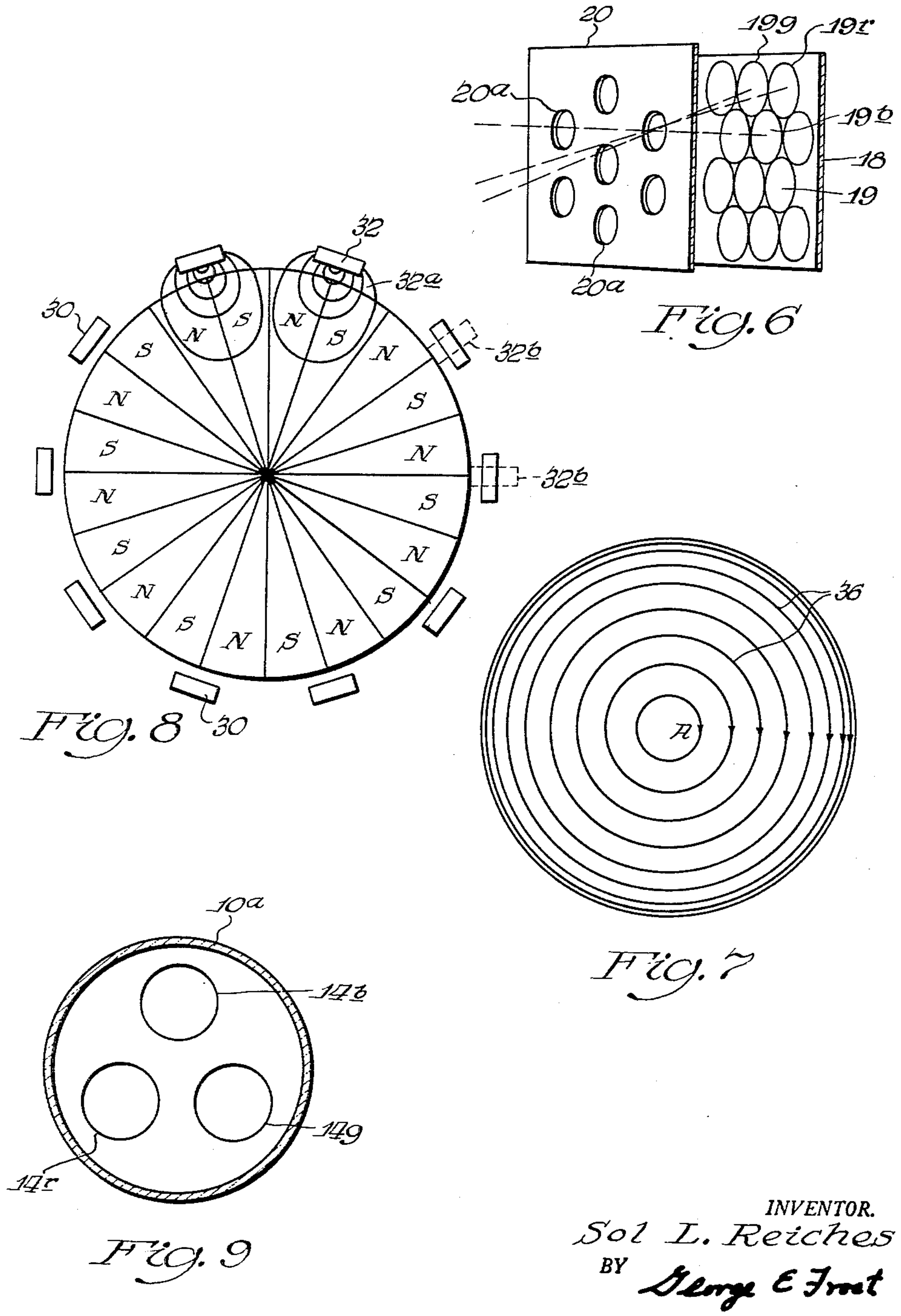
Figure 6 is a diagrammatic view in perspective showing how the cathode ray tube of Figure 1 serves to reproduce a television image in full color.
Figure 7 is a diagrammatic view showing the type of magnetic field required for radial deflection of the cathode ray beam over various positions of ray beam sweep.
Figure 8 is a similar diagrammatic view showing how the mechanism of the present invention tends to produce the desired magnet field.
Figure 9 is an enlarged cross-sectional view through axis 9—9, Figure 1.

The cathode ray tube has a series of three spaced electron guns as shown in Figure 9. These are spaced equal radial distances from the tube axis and along radii 120° apart. These electron guns are respectively indicated at 14*b*, 14*g*, and 14*r*, the designations *b*, *g*, and *r* indicating that the electron streams from the guns energize the blue, green and red phosphors as hereinafter described. It will be noted that the three electron guns are located in spaced position within the neck of the tube and are oriented in direction parallel to the axis of the tube. Consequently, as the ray beams are deflected in unison by the saw tooth currents in the coils of the deflection yoke 16, the beams approach the shadow mask 20 and the phosphor plate 18 from three separate directions. This gives rise to the color sensitivity of the tube as described hereafter.

Figure 6 shows in schematic and greatly enlarged fragmentary form the shadow mask and phosphor plate construction. It will be observed that the shadow mask 20 has a plurality of holes 20*a* disposed in a uniform geometric pattern. Behind each of these holes is a series of three phosphor dots 19, indicated at 19*g*, 19*r* and 19*b*, respectively. The dots are so positioned as to be struck by the electron beam emanating from the corresponding electron gun 14*g*, 14*r*, and 14*b*.

In operation, the electron streams from the guns are modulated in accordance with the instantaneous intensities of blue, red and green color to be produced as the television image is scanned. These time-varying electron beams are swept in unison over the face of the shadow mask 20 and phosphor plate 18 by suitable sweep current flow in the deflection yoke 16. As this takes place, the ray beams are interrupted by the shadow mask 20 to cause them to strike only the phosphor dots corresponding to the color to be reproduced. This color selective action results from the fact that the three electron guns are physically spaced in a plane normal to the axis of the tube. Consequently the electron streams approach the shadow mask and phosphor screen from slightly different directions, thus causing the "illuminated" space behind each window 20*a* of the shadow mask to be different for each color. In consequence, each electron beam strikes only the phosphor dots producing its particular color and the TV image is reproduced in full color.

In the operation of color television cathode ray tubes of the above-discussed type, it is necessary that the ray beams approach the shadow mask in such direction as to produce full color. That is, errors in the physical construction of the tube, for example, can cause the green electron beam to strike the red or blue phosphor dots, or vice versa. When this occurs, the wrong color is reproduced and the image degraded accordingly. Imperfections in other portions of the mechanism and stray magnetic fields can produce like defects.

In the mechanism of the present invention, there is provided a non-magnetic strap 22 which is of conical conformation and is adapted to fit about the conical portion 10*b* of the cathode ray tube 10. The strap is affixed by the ears 22*a* which receive a bolt 24 and nut 24*a* to clamp the strap snugly about the tube and thereby hold it firmly in position. The strap may be of aluminum, for example, and felt or rubber feet (not shown) may be sandwiched between the strap and the tube to take up the pull of the strap and provide a firm grip. A plurality of adjustable magnet units, indicated generally at 25, are disposed about the periphery of the strap at uniform angular spacings as shown in Figures 1 and 2. Each of these units consists of an angle bracket 26 having a base part 26*a* and an upstanding part 26*b*. The base part 26*a* of each bracket is pivotally attached to the face of the strap 22 by a suitable rivet 28 or similar attaching means as shown. The upstanding portion 26*b* of each bracket receives a shaft 30 which is rotatably held by suitable means to the portion 26*d*. At its outboard end each shaft 30 receives a magnet 32. As shown in Figure 3, one end 32*a* of the magnet is magnetized to form a north pole and the other end 32*b* is magnetized to form a south pole. A spring 34, Figure 3, may be used if desired to push the magnet 32 to maximum spaced position in relation to the upstanding portion 26*b* of the bracket 26. With this construction, the end 30*a* of the shaft 30 may be peened over or a head otherwise formed as shown in Figure 4 to resist the pressure of the spring. With a construction of this kind the shaft 30 may simply fit in a suitable hole in the part 26*b* of the bracket 26, as the push of spring 34 and the action of the head 30*a* will serve to hold the shaft in a direction normal to the plane of the part 26*b* of the bracket.

It will be noted that, insofar as movement of any of the magnets 32 is desired along axes having a generally radial disposition in relation to the axis A—A, Figure 1, of the tube, the brackets 26 may be rotated bodily around the respective pins 28 as shown by the dotted lines of Figure 4. This varies the orientation of the magnetic fields in the general direction of ray beam travel. If the magnets are desired to be rotated about axes transverse to the axis defined by the respective pins 28, the magnets may be rotated with shafts 30 as shown by the dotted lines of Figure 5. In either event the necessary rotation is effected by hand manipulation of the parts.

The field obtained by the assembly of Figure 2 decreases in intensity as the center of the tube is approached. Consequently the tendency to deflect the electron beams is least along axis A—A, Figure 1, and increases as the electron beams are deflected from that axis under the action of the beam sweep mechanism. This is highly desirable since the necessary correction of the direction of ray beam travel is increased as the ray beam departs from the axis of the tube. In order to effect such correction, it is desirable to have a magnetic field of intensity varying generally as shown in Figure 7, where the concentric lines 36 represent units of magnetic flux and the axis shown is that of the tube. This type of field is not physically possible to produce, especially by the apparatus disposed outside the confines of the tube. However, the apparatus of the present invention approximates such field due to the action shown in schematic fashion in Figure 8. As shown in Figure 8, each of the magnets 32 produces a fringing magnetic field as indicated by the flux lines **32*a***. These lines can be considered to combine between adjacent magnets to produce what amounts to a continuous series of circumferential flux lines in the tube similar in form to those shown in Figure 7. Because the fringing fields become less intense as departure is made from the magnets—and hence as the axis of the tube is approached—the flux concentration falls as the tube axis is approached. This is the desired condition of Figure 7.

Since the maximum corrective beam movement required is only the distance between one phosphor dot and another, the amount of required shift of the image is very small. In present tubes, for example, the distance between phosphor dots is about .029 inch, so that the requisite movement is small indeed. Moreover, in the usual course of events, the amount of the displacement required at the center of the viewing screen is about the same as at the edge. The varying magnetic field described above in connection with Figures 7 and 8 serves to provide such displacement inasmuch as the beam angle changes as the beam moves from the central axis A—A outward, and varying field strength tends to compensate for the inverse variations of ray beam deflection that would otherwise take place.

Figures 10A, 10B, 10C, 10D, 10E, 10F:
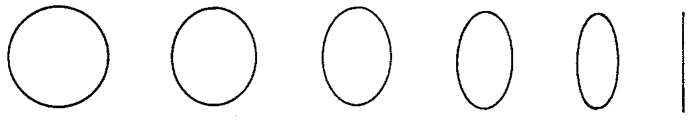

For full correction of the ray beam travel it is necessary to shift the beam or beams either radially or circumferentially, or btoh. The apparatus of the present invention does this. Insofar as the magnets are oriented as shown in Figure 8, the ray beam shift is radial, since the direction of electron motion is at right angles to both the direction of ray beam travel and the direction of the magnetic field. Insofar as the magnets are oriented with their flat faces facing the front or rear of the tube, rotation of any magnet will shift the ray beam (and hence image dot) about a circular orbit. This rotation of the magnets is shown diagrammatically at 32 and **32*b*, Figure 8. As each magnet is rotated about its respective pivot pin 28**, the orbit of ray beam shift becomes progressively more elliptical and finally degenerates to a straight line. Figures 10*a* to 10*f*, inclusive, show the various orbits through which rotation of a magnet shifts the ray beam. Figure 10*a* shows a circular orbit—provided when the face of the magnet is facing either the base or the face of the tube. Figure 10*f* shows a linear orbit—obtained when the face of the magnet is at right angles to the position of Figure 10*a*. Figures 10*b* to 10*e* are elliptical orbits obtained when the magnet is rotated about the pivot pin 28 from the position giving rise to the circular orbit of Figure 10*a* to that giving rise to the linear orbit of Figure 10*f*. It will be observed that the action of all of these adjustments is to provide a positioning of the ray beam deflection from initial position (the center of the circle of Figure 10*a*) to any radius and in any direction within the confines of the circle of Figure 10*a*. Universal adjustment is accordingly achieved.

The position of the strap 10 in relation to the longitudinal direction of the tube 10 is not critical. Preferably it should be approximately on the focal plane of the ray beams. This is the plane where the ray beams converge to substantially a point. However, the focal plane itself is only a theoretical conception and experience has shown that the apparatus of the present invention serves its purpose over a considerable range of positions. It is important, however, to position the device between the deflecting yoke 16 and the shadow mask 20, and preferably about half way between. In this position, the extent of the ray beam sweep is limited and the device can usually be physically accommodated without undue difficulty, while at the same time the necessary ray beam correction is readily obtained. Since the corrections required usually vary over the face of the shadow mask 20 and phosphor screen 18, the adjustments of the respective magnets will also usually vary about the periphery of the band 22. For purposes of illustration, such varying positions are shown in Figure 2.

Figures 11 to 13 show an alternative structure by which the position of the ray beam may be shifted as desired. In the construction of these figures, the bracket 126 is non-rotatably mounted on the support strap 22, so that the faces of magnets 132 and 133 face either the base or the face of the tube. The two magnets 132 and 133 are of like construction and are mounted on the common shaft 130 as is shown in Figure 13, the magnets being rotatable on the shaft so that they can be rotated from the aligned position of Figure 11 to non-aligned positions such as that of Figure 12. The ends of the magnets each define opposite magnet poles. Since the magnets in this instance are position to face either the neck or the face of the tube, their rotation in unison will serve to move the ray beam from initial position about a circular orbit, such as that of Figure 10*a*. However, the intensity of the magnetic field in each instance is determined by the relative positions of the magnets 132 and 133—being a maximum when they are aligned with like poles adjacent each other and being a minimum when they are aligned with opposite poles adjacent each other. The overall effect, therefore, is to provide ray beam shift about a circular orbit in each instance and having an adjustable radius. Thus the position of the ray beam shift can be varied in direction and extent to reach any position within the circular orbit defined by the magnets with their like poles adjacent each other.

In all of the constructions discussed above, the efficiency of the magnets is increased by providing a tilt to the respective shafts 30 (130, Figures 11–13) such that with the magnets facing either the face or the base of the tube, the axes define a cone generally parallel to the positions of the electron beam or beams at the most extended sweep positions. It is for this reason desirable to use a strap 22 of generally conical conformation fitting snugly on the envelope of the tube, since the tube envelope itself is generally coextensive with the positions of the ray beams at maximum sweep. And by the use of such a construction it is possible to position the axes of the shafts 30 (130, Figures 11–13) in their most effective locations without the use of special tools that might otherwise be required.

The apparatus of the present invention permits the complete correction of the ray beam travel in a single unit, as distinguished from the previous use of both a color purity magnet located on the neck **10*a* of the tube and a second correcting device located generally in the plane of the phosphor plate and shadow mask. This has a number of advantages. It permits the adjustment of the correction without a multiplicity of interrelated correcting movements. It reduces the cost of the overall construction. It serves to free valuable space along the neck 10*a*** where numerous auxiliary correcting devices (not shown) are normally used. In addition, the device is located on the conical portion of the viewing screen where there is usually space available and it is unnecessary to increase the cabinet size to accommodate the correcting mechanism.

In the appended claims I have referred to the cathode ray tube as having a generally conical envelope to indicate that it flares outwardly from the neck to the region of the viewing screen. In some tubes the cross-section departs from a circle and is to that extent a departure from the strictly conical form, although generally conical within the meaning of the claims. Also the envelope of the tube, whether literally conical or generally conical, forms a surface adjacent each magnet referred to which surface defines an element of the cone. In the appended claims I have also referred to the construction of Figures 11–13 as providing a plurality of magnet units which serve to define opposed magnet poles of adjustable intensity or strength. It will be noted in this connection that, whatever the relative positions of the magnets 132 and 133, they do in conjunction define such poles. Other constructions, such as magnets with shunting shoes, may be used if desired.

While I have shown and described specific embodiments of the present invention and with respect to specific tube types, it will, of course, be understood that other modifications and alternatives may be used without departing from the true spirit and scope thereof and that the invention may be applied to any tube wherein correction of ray beam position is desired. In particular, other means may be used to mount the magnets for substantially universal movement in a ring about the conical portion of the tube, other constructions may be used to provide the necessary adjustability, and disk or other shaped magnets may be used in lieu of the bar magnets shown. I therefore intend by the appended claims to cover all such modifications and alternative constructions as fall within their true spirit and scope.

What I claim as new and desire to secure by Letters Patent of the United States is:

1. In combination, a color TV cathode ray tube of the type having an axis, at least one electron gun adapted to produce an electron stream parallel to the axis of the tube when undeflected, and a viewing screen adapted to receive the ray beam and reproduce an image as it is swept over the screen, the tube further being of the type wherein faithful color reproduction is obtained only when the ray beam appears to originate from a predetermined design center of the tube; a band of non-magnetic material encircling and coaxial with the tube located between the electron gun and the viewing screen; a plurality of support brackets mounted on said band at substantially equal circumferential spacings and mounted for swivable movement about axes radially disposed in relation to the band, each bracket having a portion extending radially outward from the band; and a permanent magnet located on each of the last portions of the brackets, respectively, the magnets being rotatable about axes normal to the axes of swivable movement of the support brackets, whereby the ray beam travel may be adjustably corrected in both radial and circumferential direction to cause the beam to appear to originate at the design center of the tube.

2. In combination, a color TV cathode ray tube of the type having a generally conical envelope defining an axis, at least one electron gun adapted to produce an electron stream parallel to the axis of the tube when undeflected, and a viewing screen adapted to receive the ray beam and reproduce an image as it is swept over the screen, the tube further being of the type wherein faithful color reproduction is obtained only when the ray beam appears to originate from a predetermined design center of the tube; means including a plurality of circumferentially spaced permanent magnets disposed in a ring concentric with the axis of the tube and in a plane generally normal to the axis, the magnets respectively being rotatable about an axis generally parallel to the adjacent portion of the tube envelope, said means being rotatable about an axis normal to the adjacent portions of the tube envelope, thereby creating a circumferential magnetic field of decreasing intensity as the axis is approached; and means located between said permanent magnets and the electron gun to sweep the electron beam over the face of the viewing screen as if originating from said design center to reconstitute a color TV picture thereon despite imperfections in the system.

3. In combination, a color TV cathode ray tube of the type having an axis, at least one electron gun adapted to produce an electron stream parallel to the axis of the tube when undeflected, and a viewing screen adapted to receive the ray beam and reproduce an image as it is swept over the screen, the tube further being of the type wherein faithful color reproduction is obtained only when the ray beam appears to originate from a predetermined design center of the tube, a plurality of permanent magnets disposed substantially in a ring concentric with the axis of the tube, in a plane generally normal to the axis, and between the electron gun and the viewing screen, the magnets having substantially equal spacings circumferentially of the said ring and each being supported for universal adjustment of orientation to selectable positions in relation to an axis radial to the axis of the tube and in relation to an axis generally parallel to the adjacent portion of the tube envelope; and means located between the said permanent magnets and the electron gun to sweep the electron beam over the face of the viewing screen as if originating from said design center to reconstitute a color TV picture thereon despite imperfections in the system.

4. In combination, a color TV cathode ray tube of the type having a generally conical envelope defining an axis, at least one electron gun adapted to produce an electron stream parallel to the axis of the tube when undeflected, and a viewing screen adapted to receive the ray beam and reproduce an image as it is swept over the screen, the tube further being of the type wherein faithful color reproduction is obtained only when the ray beam appears to originate from a predetermined design center of the tube; a correcting device comprising a band of non-magnetic material of generally conical conformation adapted to fit on the said conical portion of the tube and deflection means located between said band and the electron gun, the band having a plurality of permanent magnets circumferentially spaced therearound and individually mounted on said band for swivable movement about an axis normal to the adacent tube surfaces and axes normal thereto to shift the ray beam as required to make it appear to originate from the design center of the tube when swept over the viewing screen.

5. A post deflection color purity correcting device for a color TV cathode ray tube of the type having a generally conical envelope defining an axis, the device comprising: a conical non-magnetic strap adapted to be received on the envelope of said tube, a plurality of brackets mounted on said strap for swivable movement on an axis radial to the axis of the envelope, and a permanent magnet mounted on each bracket for rotation about an axis normal to the axis of movement of the bracket.

References Cited in the file of this patent

UNITED STATES PATENTS

| | | |
|---|---|---|
| 2,258,643 | De Gier et al. | Oct. 14, 1941 |
| 2,513,221 | Webb | June 27, 1950 |
| 2,541,446 | Trott | Feb. 13, 1951 |
| 2,591,159 | Kabuss | Apr. 1, 1952 |
| 2,816,244 | Hillegass | Dec. 10, 1957 |
| 2,825,835 | Heppner | Mar. 4, 1958 |

FOREIGN PATENTS

| | | |
|---|---|---|
| 613,891 | Great Britain | Dec. 3, 1948 |